United States Patent
Wu

(10) Patent No.: US 8,798,317 B2
(45) Date of Patent: *Aug. 5, 2014

(54) ADJUSTING PRINT FORMAT IN ELECTRONIC DEVICE

(75) Inventor: Tung-Lin Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 199 days.

This patent is subject to a terminal disclaimer.

(21) Appl. No.: 13/328,008

(22) Filed: Dec. 16, 2011

(65) Prior Publication Data

US 2012/0243736 A1    Sep. 27, 2012

(30) Foreign Application Priority Data

Mar. 24, 2011    (TW) .............................. 100110071 A

(51) Int. Cl.
*G06K 9/00*    (2006.01)

(52) U.S. Cl.
USPC ............. 382/103; 382/106; 351/246; 358/1.2

(58) Field of Classification Search
USPC ..................... 382/103, 106; 351/246; 358/1.2
See application file for complete search history.

(56) References Cited

U.S. PATENT DOCUMENTS

| | | | |
|---|---|---|---|
| 7,171,618 B2 * | 1/2007 | Harrington et al. ........... | 715/229 |
| 7,517,086 B1 * | 4/2009 | Kurkure ........................ | 351/246 |
| 2009/0284594 A1 * | 11/2009 | Mitsuhashi ................... | 348/135 |
| 2012/0050685 A1 * | 3/2012 | Bartlett et al. ................ | 351/223 |

* cited by examiner

*Primary Examiner* — Jason M Repko
*Assistant Examiner* — Katrina Fujita
(74) *Attorney, Agent, or Firm* — Novak Druce Connolly Bove + Quigg LLP

(57) ABSTRACT

A print format adjustment system includes a receiving module, a visual condition determination module, a print format determination module, and a print control module. The receiving module receives content for printing in a first print format. The visual condition determination module establishes the sharpness of vision of a viewer in front of a display, at a predetermined view distance. The print format determination module determines a second print format based on both the first print format and the visual condition of the viewer. The print control module prints the content in the second print format.

2 Claims, 4 Drawing Sheets

ADJUSTING PRINT FORMAT IN ELECTRONIC DEVICE

CROSS-REFERENCE TO RELATED APPLICATIONS

Relevant subject matter is disclosed in co-pending U.S. Patent Applications entitled "ADJUSTING DISPLAY FORMAT IN ELECTRONIC DEVICE", U.S. application Ser. No. 13/327,998, Filed Dec. 16, 2011, and "ADJUSTING DISPLAY FORMAT IN ELECTRONIC DEVICE", U.S. application Ser. No. 13/328,019, Filed on Dec. 16, 2011.

BACKGROUND

1. Technical Field

The disclosure generally relates to a system and a method for adjusting print format in an electronic device.

2. Description of Related Art

Generally, a desktop computer or a mobile terminal includes a display screen for communicating with a user. The user may edit a document in a WYSIWYG (what you see is what you get) mode on the display screen for printing. When the font size and/or image size of the content in the document is too small, it will be difficult for the user to view the final printed content clearly. A user may manually scale down or scale up the text font size and/or the image size of the content to achieve optimum viewing before the content is printed. But it's inconvenient for the user to adjust the print format manually. Therefore, there is a need for a technique automatically adjusting the size of the content to make the user view the printed content more clearly and more easily.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
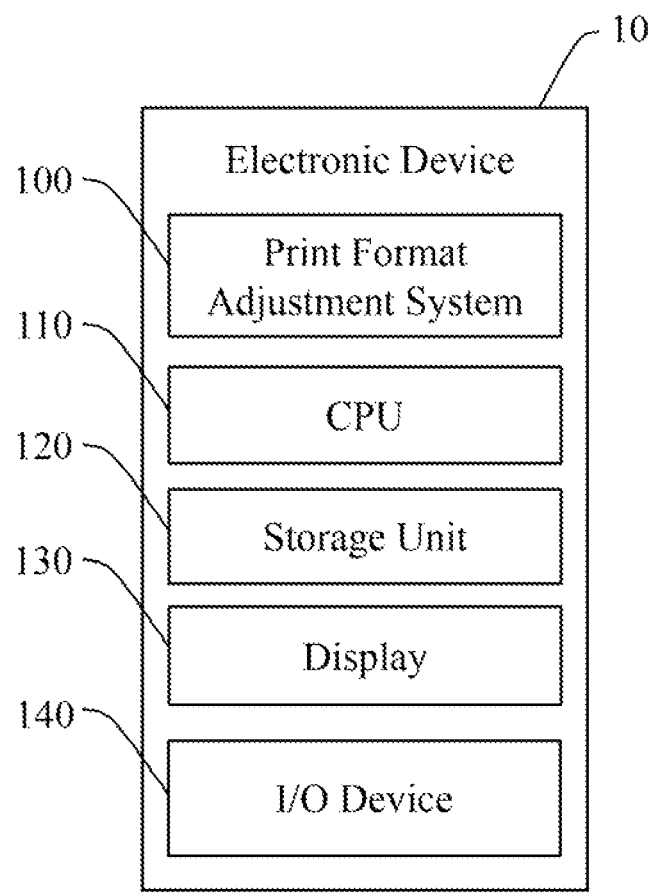
FIG. 1 is a schematic diagram of one embodiment of an electronic device with a print format adjustment system.

FIG. 1 is a schematic diagram of one embodiment of an electronic device 10. In one embodiment, the electronic device 10 includes a print format adjustment system 100, at least one central processing unit (CPU) 110, a storage unit 120, a display 130, and other I/O device(s) 140. The electronic device 10 implements the functions of the print format adjustment system 100. The electronic device 10 may be a general purpose computing device such as a desktop computer, a tablet computer, a personal digital assistant (PDA), or a smart phone. The electronic device 10 may also be a multi-function printer.

The storage unit 120 may be any form of volatile or non-volatile storage, including, for example, RAM, ROM, EPROM, flash memory, a magnetic disk such as an internal hard disk or a removable disk, an optical disk such as a CD-ROM, or any other storage device which can be used to store the desired information and which can be accessed by the print format adjustment system 100. The storage unit 120 may store machine-executable instructions, data, and various programs, such as an operating system and one or more application programs, all of which may be processed by the CPU 110. The display 130 can be a liquid crystal display (LCD) or a cathode-ray tube (CRT) display. The electronic device 10 may include one or more I/O devices 140 such as a keyboard, a mouse, a touch pad, or other pointing device. The storage unit 120, the display 130 and the other I/O devices 140 are connected to the CPU 110 through a system bus (not shown in FIG. 1).

Figure 2:
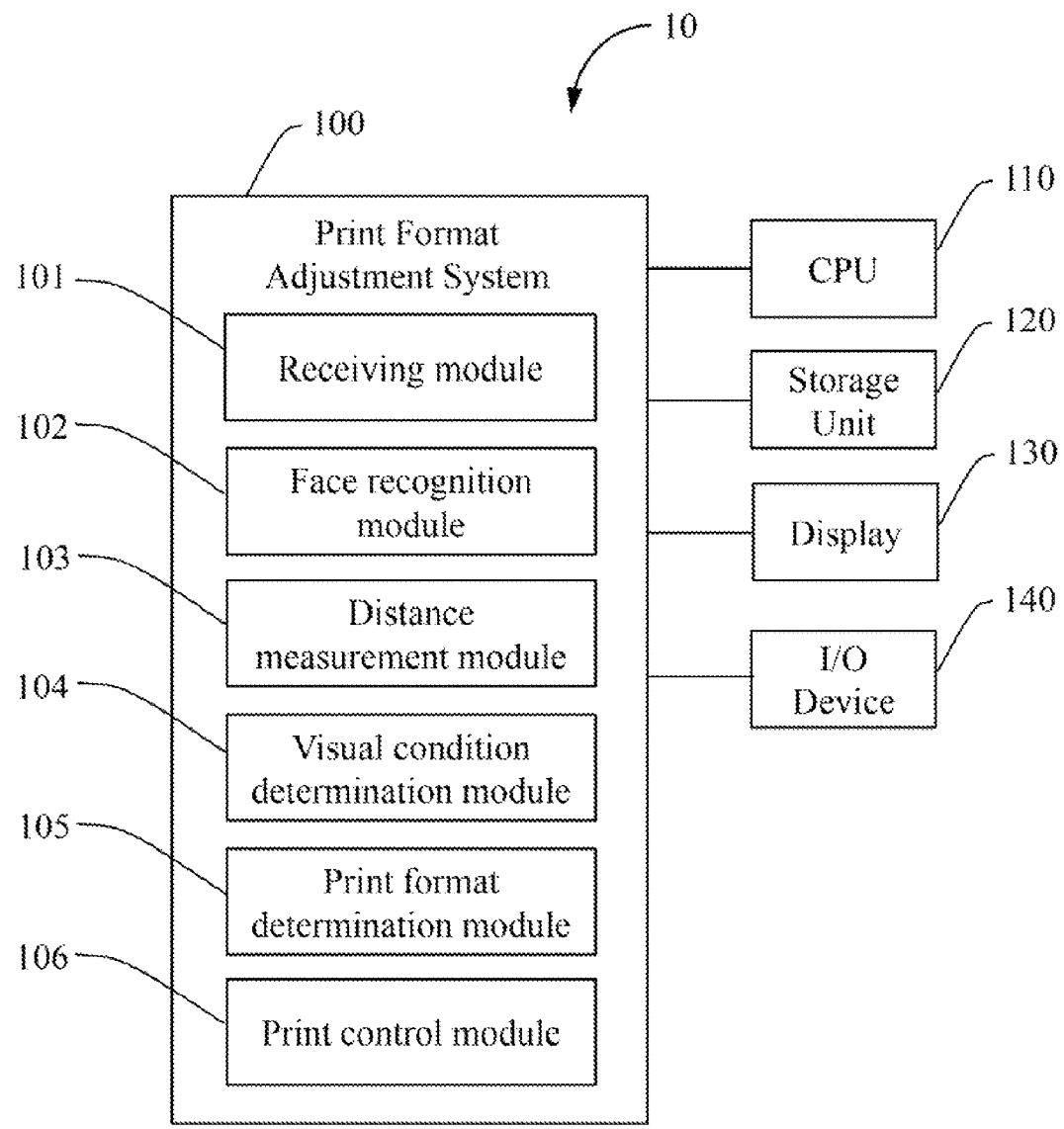
FIG. 2 is a schematic diagram of one embodiment of the function modules of the print format adjustment system of FIG. 1.

FIG. 2 illustrates a schematic diagram of one embodiment of the function modules of the print format adjustment system 100. In one embodiment, the print format adjustment system 100 includes a receiving module 101, a face recognition module 102, a distance measurement module 103, a visual condition determination module 104, a print format determination module 105, and a print control module 106. Each of the modules 101-106 may be a software program including one or more computerized instructions that are stored in the storage unit 120 and executed by the CPU 110.

The receiving module 101 may receive content for printing in a first print format. The content may include text and/or images. The first print format may include text font size information and/or image size information for defining the appearance and style of the content when it is printed on paper. The text font size may include the height and width, such as 18×18 pixels, to define the size of a text font. The image size may include the height and width, such as 320×480 pixels, to define the size of an image.

The face recognition module 102 is able to recognize the face of a viewer in front of the display 130. The face recognition module 102 may capture an image of the viewer using a camera and thereby identify the face of the viewer through the captured image.

The distance measurement module 103 is installed in the electronic device 10 for taking continuous measurements of the distance between the face of the viewer and the display 130. The distance measurement module 103 may use one or more of a variety of distance detecting technologies such as ultrasonic, infrared and lasers.

Figure 3:
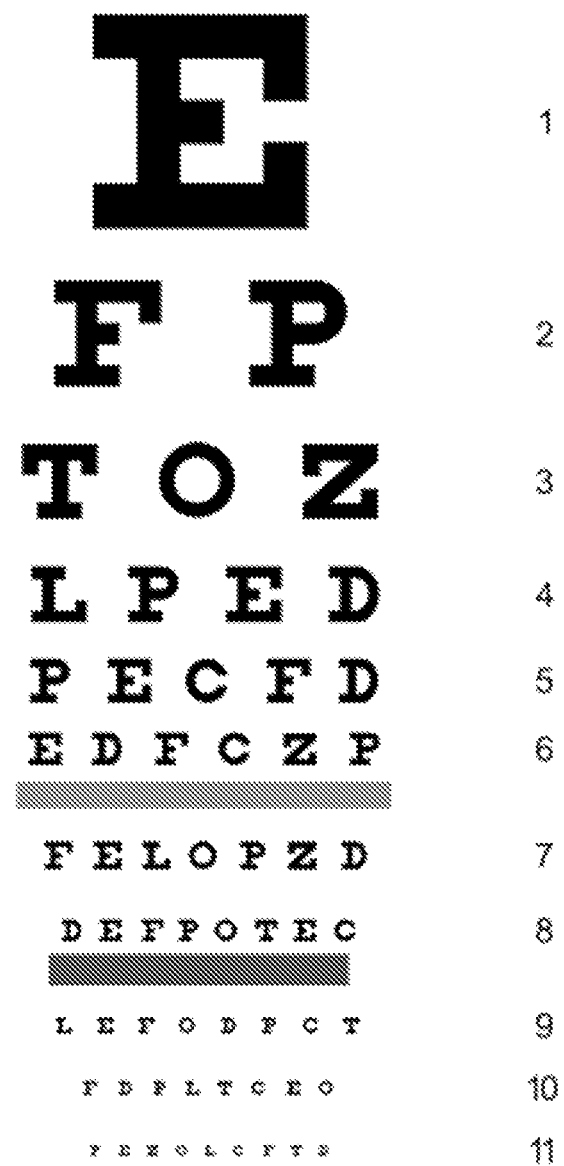
FIG. 3 shows an example of a visual acuity test chart.

When the current distance between the face of the viewer and the display is equal to a predetermined distance, such as 2 feet, the distance measurement module 103 may stop measuring the current view distance and the visual condition determination module 104 may determine the visual abilities, or sharpness of vision (visual condition) of the viewer at the predetermined view distance. In one embodiment, the visual condition determination module 104 may receive a visual acuity index input by the viewer. In another embodiment, the visual condition determination module 104 may inform the viewer of a visual acuity examination by outputting an alert via a speaker of the electronic device 10 and display a visual acuity test chart on the display 130. FIG. 3 shows an example of a visual acuity test chart (a Snellen chart). The Snellen chart displays eleven lines of block letters. The smallest row that can be read accurately indicates the visual acuity of the viewer. The identification number of the smallest row can serve as the visual acuity index of the viewer. The visual condition determination module 104 may determine a visual acuity index for the viewer by testing the viewer using the visual acuity test chart. According to the determined visual acuity index, the visual condition determination module 104 may determine a minimal size. The minimal size is a size of which a visual element smaller than is unrecognizable for the viewer at the predetermined view distance. The minimal size may include information concerning height and width. For example, if the visual condition determination module 104 determines that the visual acuity index of a particular viewer is "6", the minimal size for index "6" of the visual acuity index may be 18×18 pixels.

The print format determination module 105 may determine a second print format based on both the first print format and the determined visual condition of the viewer. The print format determination module 105 may obtain the size of the second print format by using an equation as follows:

$$\begin{cases} S_2 = S_1, & (S_{min} \geq S_{va}) \\ S_2 = S_1 * (S_{va} / S_{min}), & (S_{min} < S_{va}) \end{cases}$$

where $S_2$ represents the size of the second print format, $S_1$ represents the size of the first print format, $S_{va}$ represent the minimal size relative to the visual acuity index, and $S_{min}$ represents the size of the smallest visual element in the first print format.

When the second print format has been determined, the print control module 106 may print the content in the second print format.

Figure 4:
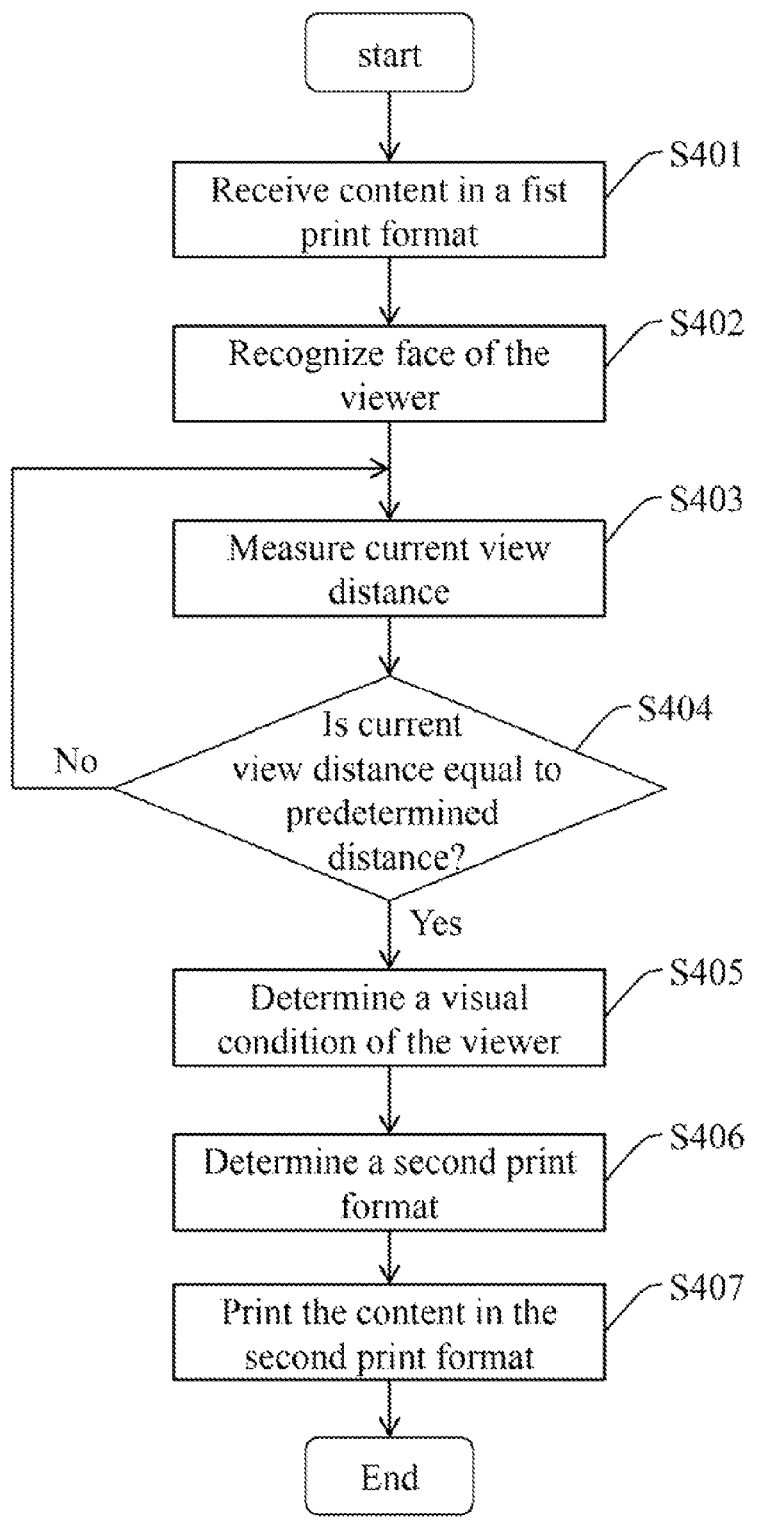
FIG. 4 is an operational flow diagram representing one embodiment of a method for adjusting print format using the print format adjustment system of FIG. 1.

FIG. 4 is a flowchart illustrating one embodiment of a method for adjusting a print format using the print format adjustment system of FIG. 1. The method may include the following steps.

In step S401, the receiving module 101 receives content for printing in a first print format.

In step S402, the face recognition module 102 recognizes the face of a viewer in front of the display 130.

In step S403, the distance measurement module 103 measures the current view distance between the face of the viewer and the display 130.

In step S404, the distance measurement module 103 determines whether the current view distance is equal to a predetermined view distance. If the current view distance is equal to a predetermined view distance, the flow goes to step S405. Otherwise, the flow goes to step S403.

In step S405, the visual condition determination module 104 determines a visual condition of the viewer. The visual condition determination module 104 displays a visual acuity test chart on the display 130, and determines a visual acuity index for that viewer by testing the viewer using the visual acuity test chart. According to the determined visual acuity index, the visual condition determination module 104 determines a minimal size. The minimal size is a size of which a visual element smaller than is unrecognizable for the viewer at the predetermined view distance.

In step S406, the print format determination module 105 determines the parameters of a second print format based on both the first print format and the visual condition of the viewer. The print format determination module 105 obtains the size of the second print format by using an equation as follows:

$$\begin{cases} S_2 = S_1, & (S_{min} \geq S_{va}) \\ S_2 = S_1 * (S_{va} / S_{min}), & (S_{min} < S_{va}) \end{cases}$$

where $S_2$ represents the size of the second print format, $S_1$ represents the size of the first print format, $S_{va}$ represent the minimal size relative to the visual acuity index, and $S_{min}$ represents the size of the smallest visual element defined by the first print format.

In step S407, the print control module 106 prints the content in the second print format.

Although numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

Depending on the embodiment, certain steps or methods described may be removed, others may be added, and the sequence of steps may be altered. The description and the claims drawn for or in relation to a method may include some indication in reference to certain steps. However, any indication used is only to be viewed for identification purposes and not as a suggestion as to an order for the steps.

What is claimed is:

1. A computer-implemented method for adjusting print format in an electronic device, the method comprising:
   receiving content for printing in a first print format by a processor of the electronic device;
   continuously measuring current distance between a viewer and a display of the electronic device by a distance detecting device of the electronic device;
   when the current distance between the viewer and the display is equal to a predetermined distance, determining a visual condition of the viewer at the predetermined distance by the processor;
   determining a second print format based on the first print format and the visual condition of the viewer by the processor; and
   printing the content in the second print format;
   wherein the step of determining the visual condition of the viewer comprises: displaying a visual acuity test chart on the display; determining a visual acuity index by testing the viewer using the visual acuity test chart; and determining a minimal size relative to the visual acuity index, wherein the minimal size is a size of which a visual element smaller than is unrecognizable for the viewer at the predetermined distance;
   the step of determining the second print format comprises obtaining size of the second print format by using an equation as follows:

$$\begin{cases} S_2 = S_1, & (S_{min} \geq S_{va}) \\ S_2 = S_1 * (S_{va}/S_{min}), & (S_{min} < S_{va}) \end{cases}$$

where $S_2$ represents the size of the second print format, $S_1$ represents size of the first print format, $S_{va}$ represent the minimal size relative to the visual acuity index, $S_{min}$ represents size of the smallest visual element defined by the first print format.

2. An electronic device, comprising:
- a storage unit;
- a processor coupled to the storage unit;
- one or more programs being stored in the storage unit and executable by the processor, the one or more programs comprising:
- a receiving module configured for receiving content for printing in a first print format;
- a distance measurement module configured for continuously measuring current distance between a viewer and a display of the electronic device;
- a visual condition determination module configured for determining a visual condition of the viewer at a predetermined distance when the current distance between the viewer and the display is equal to the predetermined distance;
- a print format determination module configured for determining a second print format based on the first print format and the visual condition of the viewer; and
- a print control module configured for printing the content in the second print format;
- wherein the visual condition determination module is configured for displaying a visual acuity test chart on the display, determining a visual acuity index by testing the viewer using the visual acuity test chart, and determining a minimal size relative to the visual acuity index, where the minimal size is a size of which a visual element smaller than is unrecognizable for the viewer at the predetermined distance; and
- the second print format determination module is configured for obtaining size of the second print format by using an equation as follows:

$$\begin{cases} S_2 = S_1, & (S_{min} \geq S_{va}) \\ S_2 = S_1 * (S_{va}/S_{min}), & (S_{min} < S_{va}) \end{cases}$$

where $S_2$ represents the size of the second print format, $S_1$ represents size of the first print format, $S_{va}$ represent the minimal size relative to the visual acuity, $S_{min}$ represents size of the smallest visual element defined by the first print format.

* * * * *